W. B. HOMER.
DRAFT EQUALIZER.
APPLICATION FILED JULY 9, 1912.
1,056,678.
Patented Mar. 18, 1913.
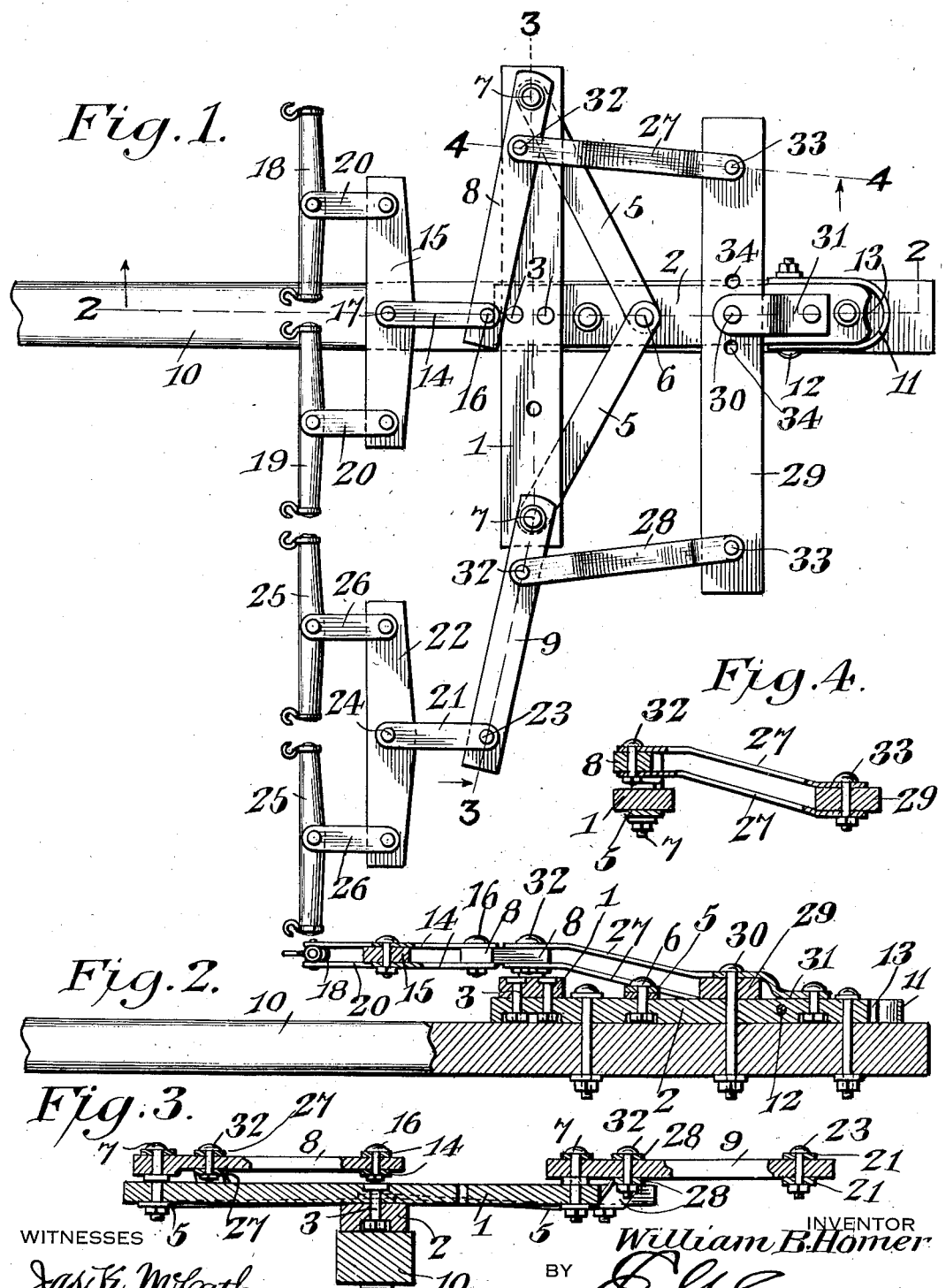
WITNESSES
INVENTOR
William B. Homer
BY
ATTORNEY

UNITED STATES PATENT OFFICE.

WILLIAM B. HOMER, OF SPRINGFIELD, SOUTH DAKOTA.

DRAFT-EQUALIZER.

1,056,678.

Specification of Letters Patent. Patented Mar. 18, 1913.

Application filed July 9, 1912. Serial No. 708,467.

*To all whom it may concern:*

Be it known that I, WILLIAM B. HOMER, a citizen of the United States, residing at Springfield, in the county of Bonhomme and State of South Dakota, have invented a new and useful Draft-Equalizer, of which the following is a specification.

The invention relates to improvements in draft equalizers.

The object of the present invention is to improve the construction of draft equalizers, and to provide a simple and inexpensive draft equalizer of strong and durable construction, designed for use on agricultural and other machines, and capable of equalizing the draft between a single draft animal at one side of a pole or tongue and a plurality of draft animals at the opposite side thereof without producing a side draft in the equalizer.

With these and other objects in view, the invention consists in the construction and novel combination of parts hereinafter fully described, illustrated in the accompanying drawing, and pointed out in the claim hereto appended; it being understood that various changes in the form, proportion, size and minor details of construction, within the scope of the claim, may be resorted to without departing from the spirit or sacrificing any of the advantages of the invention.

In the drawing:—Figure 1 is a plan view of a draft equalizer, constructed in accordance with this invention. Fig. 2 is a longitudinal sectional view on the line 2—2 of Fig. 1. Fig. 3 is a transverse sectional view on the line 3—3 of Fig. 1. Fig. 4 is a detail longitudinal sectional view on the line 4—4 of Fig. 1.

Like numerals of reference designate corresponding parts in all the figures of the drawing.

In the accompanying drawing in which is illustrated the preferred embodiment of the invention, the draft equalizer comprises in its construction a support including a transverse supporting bar 1 and a longitudinal bar 2 extending rearwardly from the transverse supporting bar 1 and rigidly secured to the same by bolts 3, or other suitable fastening means, and maintained in rigid relation by a pair of forwardly diverging braces 5, having their rear ends overlapped and secured together and to the longitudinal bar by a bolt 6, and connected to the outer ends of the transverse bar 1 by pivot bolts 7, which connect a pair of transverse levers 8 and 9 to the support. The support may be bolted or otherwise secured to a tongue or pole 10 of an agricultural or other machine, or it may be used independently of such a tongue or pole 10, as the longitudinal bar constitutes a short pole or beam and is equipped at the rear end with a clevis 11 to enable it to be connected to a machine or vehicle. The clevis, which is U-shaped, embraces the rear end of the longitudinal bar or beam 2 and is pivoted to the same by a transverse bolt 12. The rear end 13 of the bar or beam 2 is provided with a recess, and the transverse portion of the clevis extends across the same in spaced relation with the wall of the recess to form a space or opening for suitable fastening means for securing the draft equalizer to an agricultural or other machine, but any other suitable form of attachment may, of course, be employed.

The transverse bar 1 extends laterally from opposite sides of the draft pole or beam, and the transverse lever 8, which is pivoted at its outer end to one end of the transverse bar 1, extends inwardly in a direction longitudinally of the bar 1 to a point above the draft beam or pole, and is connected by links 14 with a doubletree 15. A pair of links 14 is employed, and they are secured to the lever 8 and the doubletree 15 by pivot bolts 16 and 17, located in the plane of the draft beam or pole. The doubletree extends from opposite sides of the draft beam or pole 10, and is equipped with swingletrees 18 and 19, also located at opposite sides of the beam or pole 10 and connected with the ends of the doubletree by links 20, or other suitable means.

The transverse lever 9 is pivoted at its inner end to the other end of the transverse supporting bar 1, and it extends outwardly therefrom in a direction longitudinally thereof, and it is connected at its outer end by links 21 with a doubletree 22. A pair of the links 21 is employed and they are connected to the transverse lever 9 and the doubletree 22 by bolts 23 and 24. The doubletree is equipped at its ends with swingletrees 25, connected by links 26 with the ends of the doubletree.

The transverse levers 8 and 9 are connected at points intermediate of their ends and adjacent to their inner ends by links 27 and 28 with a transverse equalizing lever 29, located in rear of the transverse levers 8 and 9 and pivoted at an intermediate point to the longitudinal bar or beam 2 of the support by a vertical bolt 30, which is preferably supported by a metallic strap 31. The transverse levers 8 and 9 are located in a plane slightly above the plane of the equalizing lever 29, and the links 27 and 28, which are arranged in pairs, have intermediate inclined portions and are pivoted to the levers 8 and 9 and the equalizing lever 29 by bolts 32 and 33. The rear equalizing lever is substantially the same length as the fixed transverse bar 1, and the transverse levers 8 and 9 are of a uniform length and are pivotally connected to the front ends of the links 27 and 28 at a uniform distance from their pivots 7. The equalizing lever 29 is provided with a plurality of perforations 34, which are adapted to receive the pivot bolt 30 to permit an adjustment of the equalizing lever to enable the parts to be arranged for equalizing the draft between the desired number of draft animals. While the draft equalizer is constructed to arrange one horse at the right hand side of the draft beam or pole, the parts may be reversed to arrange one horse at the left hand side and the others at the right hand. Instead of employing the doubletrees or whiffletrees 15 and 22, whiffletrees of any length and equipped with any desired number of swingletrees may, of course, be employed, the equalizing lever being correspondingly adjusted to equalize the draft between the transverse levers.

What is claimed is:—

A draft equalizer comprising a support including a draft beam or pole, and a relatively fixed transverse bar extending from opposite sides of the same, a transverse equalizing lever pivoted intermediate of its ends at a point in rear of the said bar and extending from opposite sides of the draft beam or pole, an inwardly extending transverse lever pivoted at its outer end to one end of the transverse bar and extending to a point above the draft beam or pole, an outwardly extending transverse lever of substantially the same length as the inwardly extending transverse lever and pivoted at its inner end to the other end of the transverse bar and extending outwardly therefrom, longitudinal links located at opposite sides of the draft beam or pole and pivoted at their rear ends to the end portions of the equalizing lever and pivotally connected at their front ends to the transverse levers at approximately uniform distances from the pivots of the same, and whiffletrees connected to the free ends of the transverse levers and provided with swingletrees, the whiffletrees of the inwardly extending transverse lever being located above the draft beam or pole and extending from opposite sides thereof and having one of its swingletrees located at one side of the said beam or pole.

In testimony that I claim the foregoing as my own, I have hereto affixed my signature in the presence of two witnesses.

WILLIAM B. HOMER.

Witnesses:
C. L. HILL,
VINTA R. NACE.